(No Model.)  3 Sheets—Sheet 1.
G. W. & J. F. AYRES.
MIDDLINGS PURIFIER.
No. 248,690.  Patented Oct. 25, 1881.
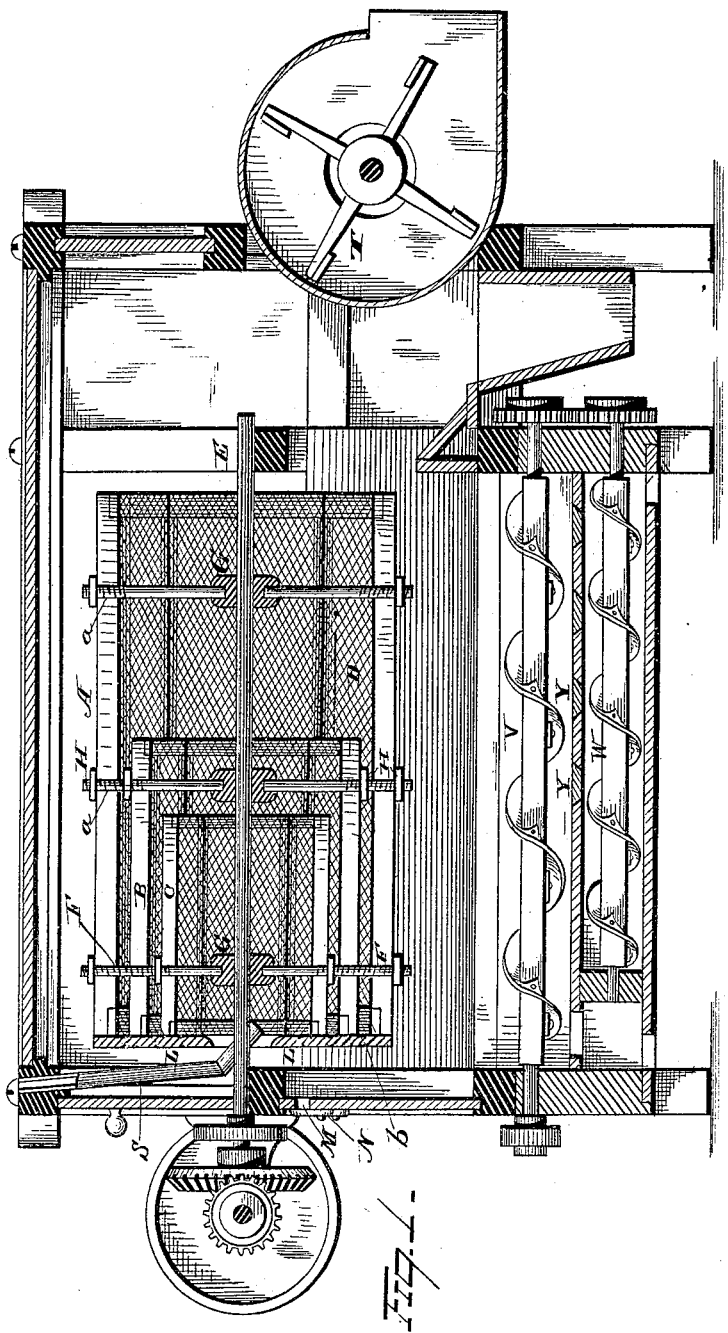
WITNESSES  
INVENTORS  
George W Ayres  
John F Ayres  
By Leggett & Leggett, ATTORNEYS.

(No Model.) 3 Sheets—Sheet 2.
G. W. & J. F. AYRES.
MIDDLINGS PURIFIER.
No. 248,690. Patented Oct. 25, 1881.
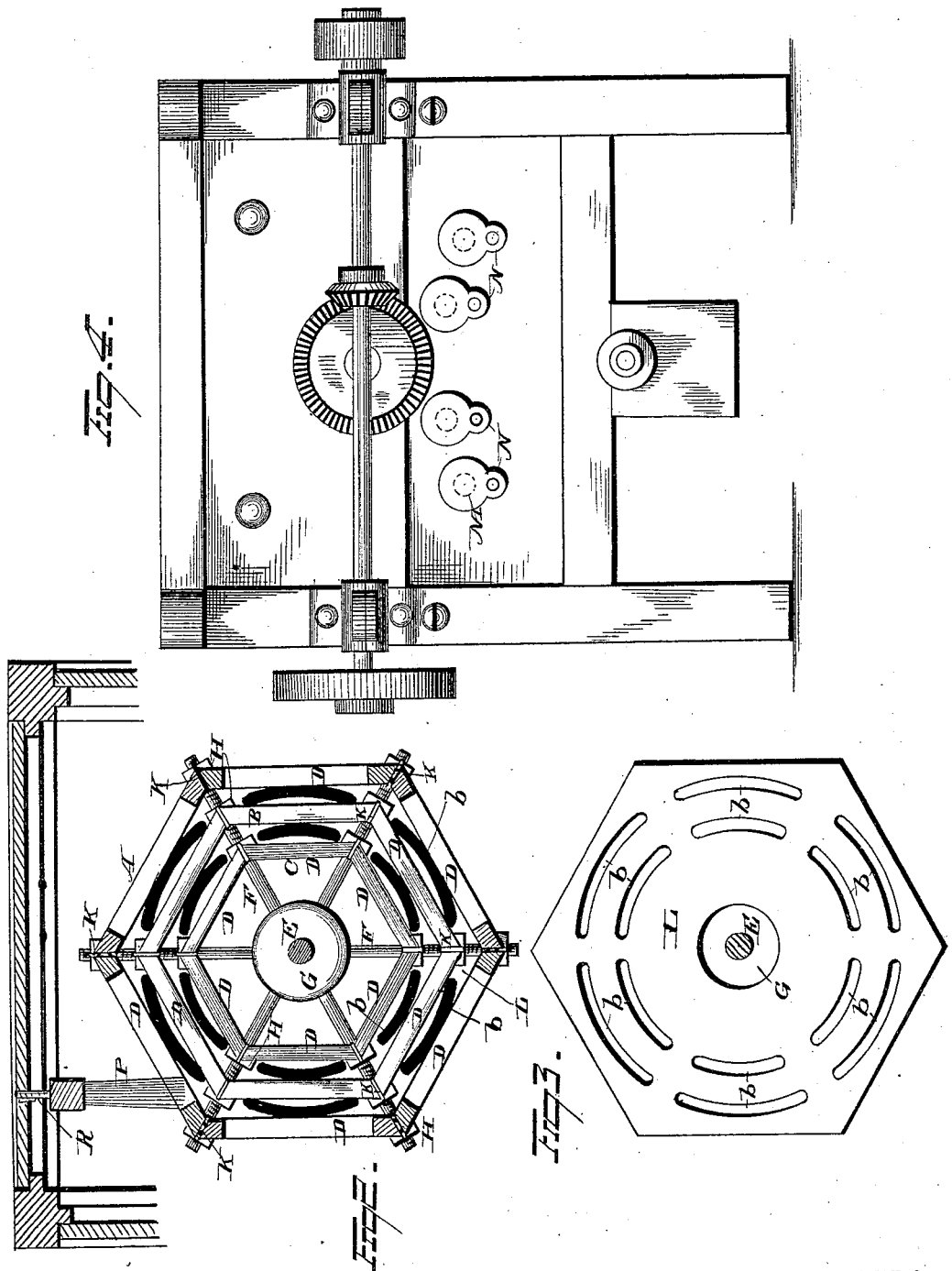
WITNESSES
E. S. Nottingham
A. S. Lawrence
INVENTORS
Geo. W. Ayres,
John F. Ayres.
By Leggett & Leggett
ATTORNEYS (No Model.)  G. W. & J. F. AYRES.  3 Sheets—Sheet 3.
MIDDLINGS PURIFIER.
No. 248,690.  Patented Oct. 25, 1881.
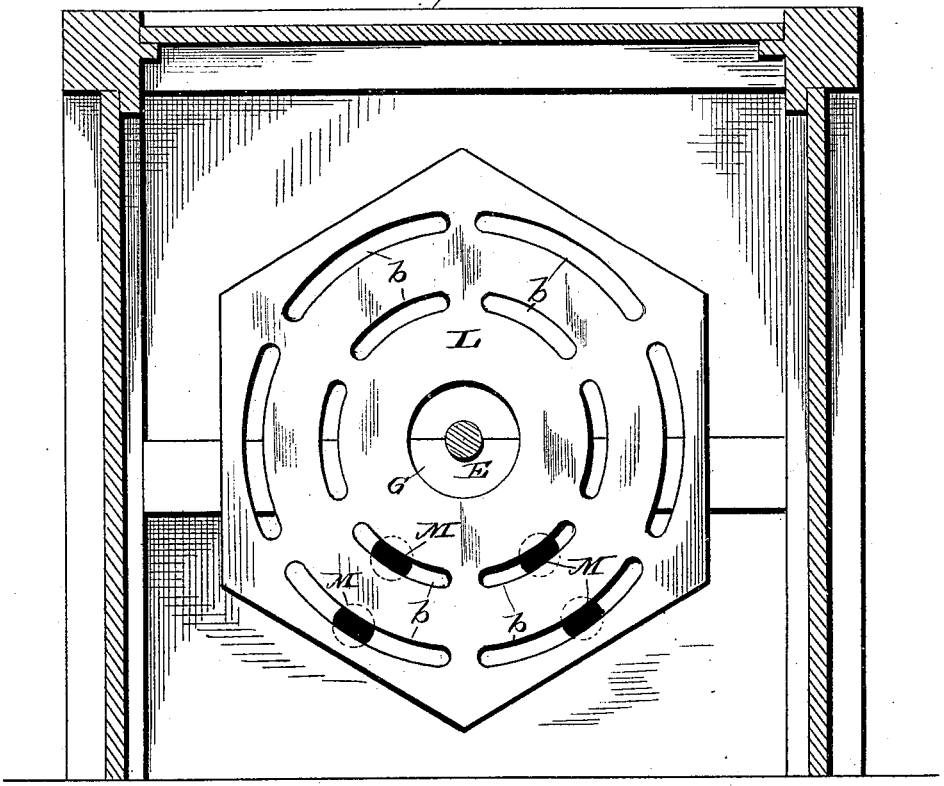
WITNESSES  INVENTORS

UNITED STATES PATENT OFFICE.

GEORGE W. AYRES AND JOHN F. AYRES, OF ALLOWAYSTOWN, N. J.

MIDDLINGS-PURIFIER.

SPECIFICATION forming part of Letters Patent No. 248,690, dated October 25, 1881.

Application filed September 17, 1880. (No model.)

*To all whom it may concern:*

Be it known that we, GEORGE W. AYRES and JOHN F. AYRES, of Allowaystown, in the county of Salem and State of New Jersey, have invented certain new and useful Improvements in Middlings-Purifiers; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

Our invention is intended to provide certain improvements in middlings-purifiers, whereby the process of purifying may be carried on more effectually and with better results than heretofore.

Our invention consists in certain features of construction and combination of parts, as will hereinafter be described, and pointed out in the claim.

Referring to the drawings, Figure 1 is a longitudinal vertical section of the machine. Fig. 2 is a detail transverse section of the triple reel. Fig. 3 is a detail view, in front elevation, of the head of the triple reel. Fig. 4 is a view in elevation of the forward end of the machine. Fig. 5 is a detail view, illustrating the air-openings of the case in line with the openings in the reel-head.

The triple sieve-reel is composed of the three reels, united as shown. The outer reel, A, incloses the middle-sized reel B, and the latter incloses the smallest reel C. Preferably, the middle reel is about one-half the length of the large reel, and the small reel is about three-fourths the length of the middle reel; but these linear dimensions, as well as the transverse dimensions of the reels, may be varied from the relative dimensions indicated in the drawings, provided that each reel which incloses another is greater in length and diameter than the reel which it incloses. Each component reel is formed of several independent sieve-sections, D, adapted to be bound together at a greater or less distance from the reel-shaft E. This adjustment is attained by radial arms F, extending from heads G, secured on the reel-shaft. These arms fit in transverse grooves a, formed in the meeting edges of the sections, and nuts H work on the screw-threaded portions of the arms which project from said grooves. Each reel, with its several sieve-sections, is free to move on the reel-head L, accordingly as the nuts which adjust the diameter of said reel may bind the sections together into greater or less compass.

The forward end of the machine-case is provided with a series of air-openings, M, governed by valves N.

The reel-head is provided with a series of slitted openings, b, formed respectively between the outer and middle reels and between the inner and middle reels. These slitted openings conduct into the triple sieve-reel the air which has been admitted into the forward portion of the machine-case through the air-holes.

It will be observed that the series of air-openings in the case are arc-shaped, the openings at the extremities of the arc-shaped slots being in line with the openings of the reel-head formed between the middle and the outer reels, the openings at the central portion of the arc-shaped slots being in line with the openings of the reel-head formed between the inner and the middle reels. These series of air-openings in the case are located in a plane below the axis of the reel.

A brush, P, extends lengthwise over the sieve-reel and swings freely from pendants R, secured to the top of the machine-case. This brush is of length corresponding to the sections of the outer reel, and sweeps the outer side of the latter as the reel revolves. The middlings are fed through the spout S into the forward portion of the inner reel. The lightest impurities are taken from the middlings by the exhaust through fan T, as the middlings pass from the inner to the middle sieve. The next heavier grade of impurities is taken from the middlings as the latter pass from the middle to the outer reel. The upper conveyer, V, carries the middlings to the forward portion of the machine, and the lower conveyer, W, returns the middlings to the tail end of the machine. Slides Y determine the points of communication between the two conveyers.

A purifier constructed in accordance with the preceding description we have practically found to admirably answer the several ends in view, as stated in the first part of the specification.

Having fully described our invention, what we claim as new, and desire to secure by Letters Patent, is—

In a middlings-purifier, the combination, with the forward end of the case provided with an air-opening, of a series of reels attached at their upper ends to a single reel-head, the largest and longest reel being located on the outside, and the inner reels gradually decreasing in size and length toward the center, said reel-head being provided with a series of air-openings located to establish air-passages between the reels, substantially as set forth.

In testimony that we claim the foregoing we have hereunto set our hands this 1st day of September, 1880.

GEO. W. AYRES.
JOHN F. AYRES.

Witnesses:
JAMES R. BARKER,
RICHD. C. MILLER.